Oct. 24, 1939.  A. N. SPÁNEL  2,177,308
RUBBER PANTS
Filed March 10, 1937   3 Sheets-Sheet 1
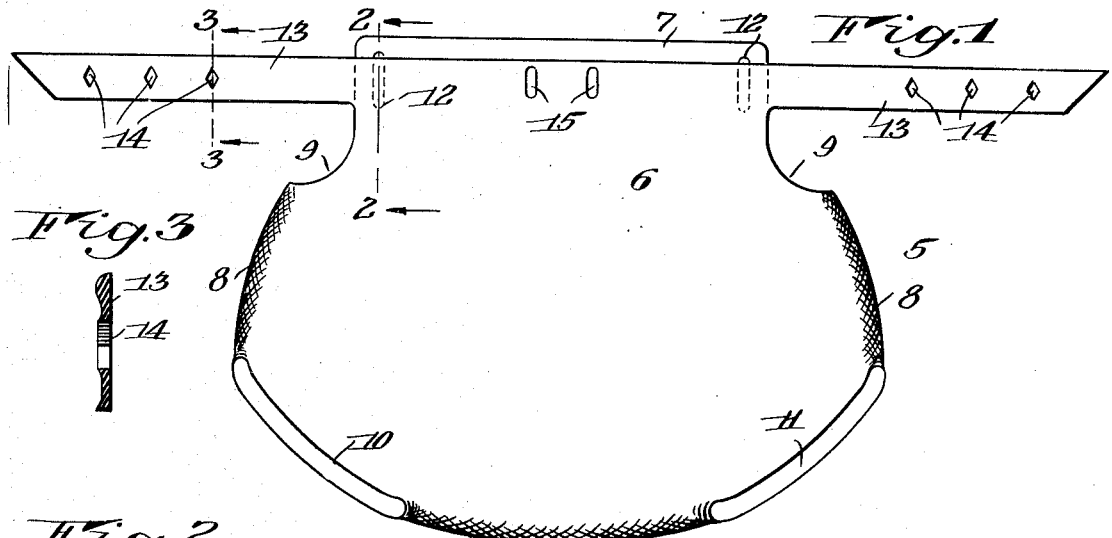
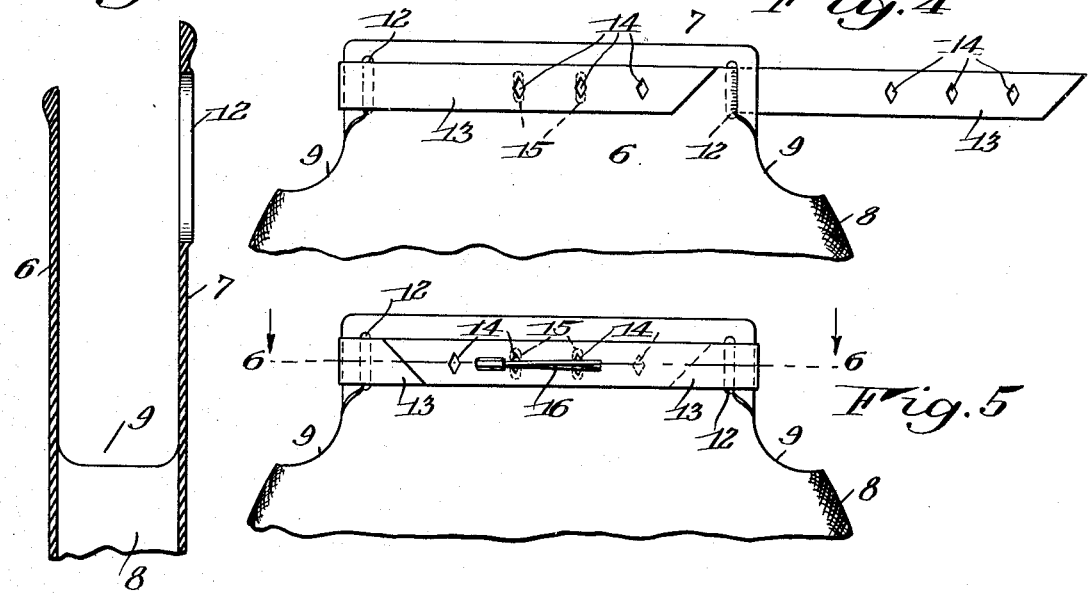
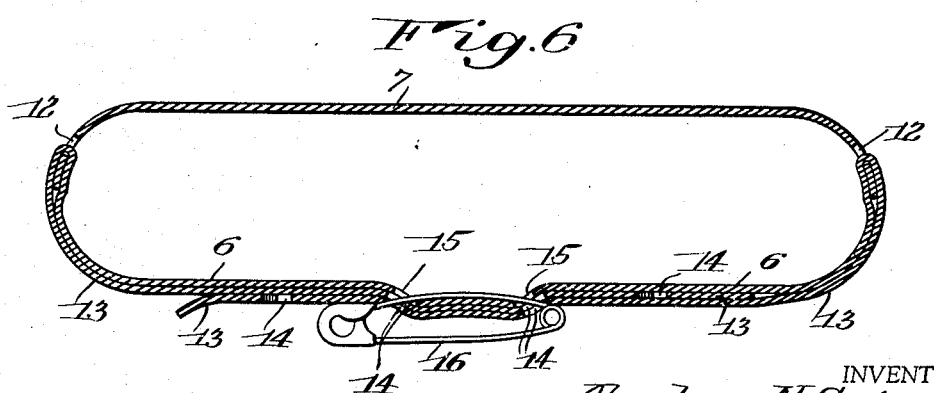
INVENTOR.
Abraham N. Spánel
BY D. Clyde Jones
his ATTORNEY.

Oct. 24, 1939.  A. N. SPÁNEL  2,177,308
RUBBER PANTS
Filed March 10, 1937   3 Sheets-Sheet 2
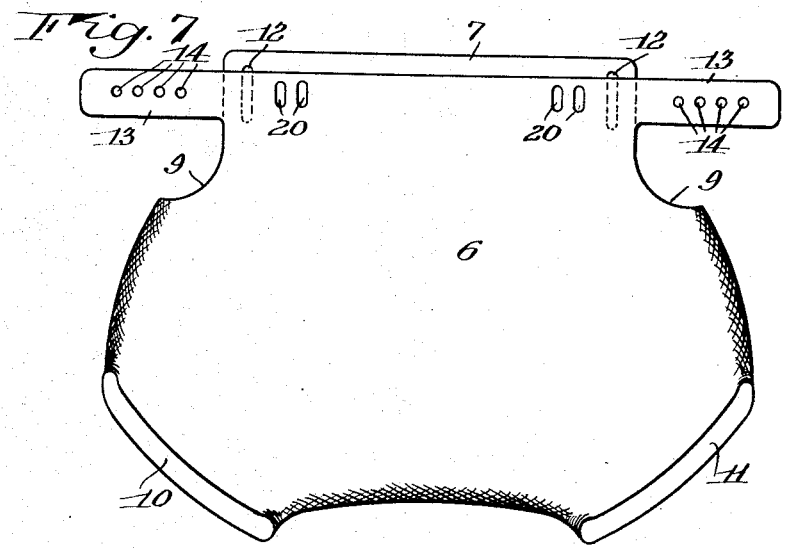
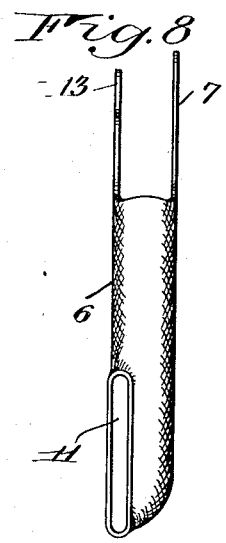
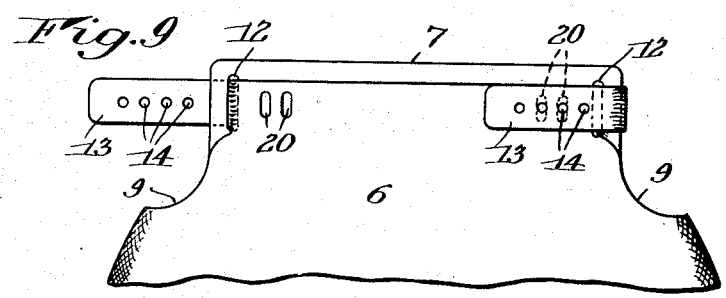
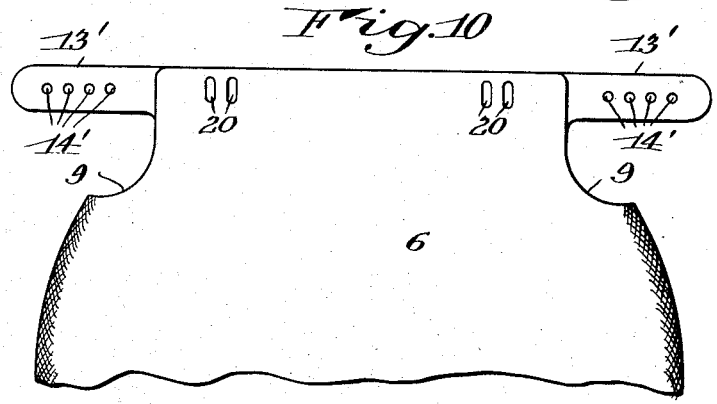
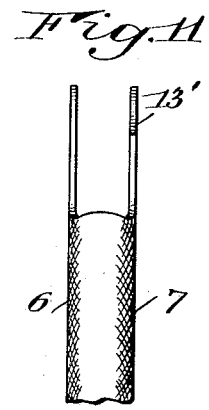
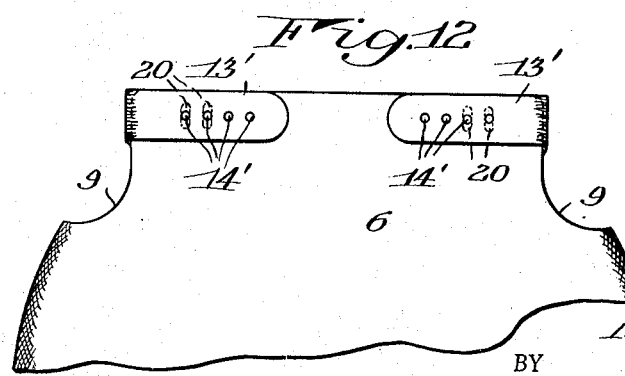
INVENTOR.
Abraham N. Spánel
BY D. Clyde Jones
his ATTORNEY.

Oct. 24, 1939.  A. N. SPANEL  2,177,308
RUBBER PANTS
Filed March 10, 1937   3 Sheets-Sheet 3
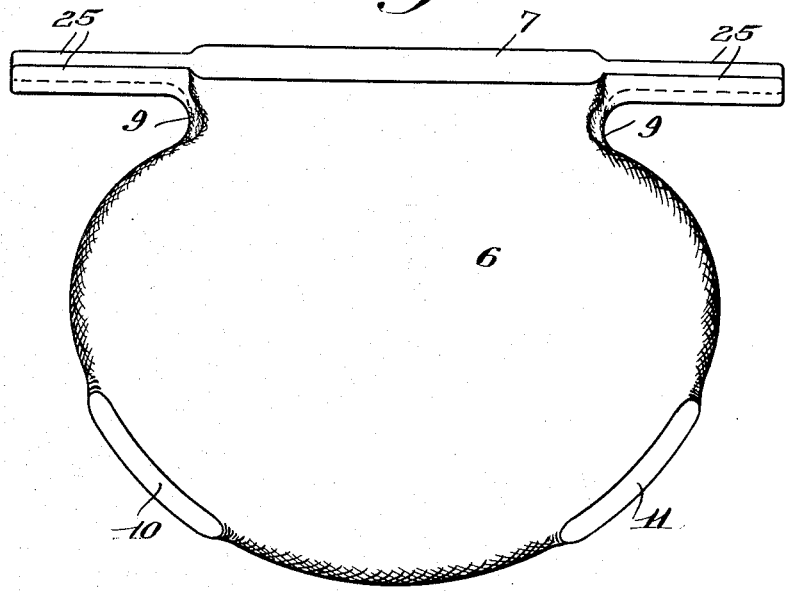
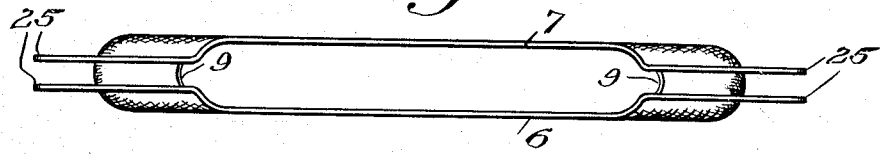
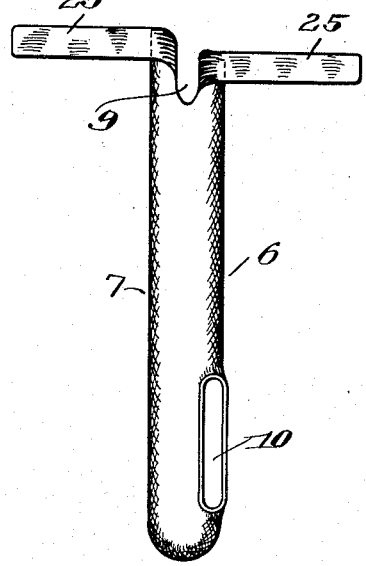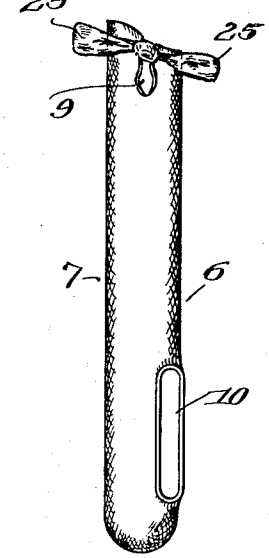
INVENTOR.
Abraham N. Spanel
BY D. Clyde Jones
his ATTORNEY.

Patented Oct. 24, 1939

2,177,308

UNITED STATES PATENT OFFICE 2,177,308

RUBBER PANTS

Abraham N. Spánel, Rochester, N. Y.

Application March 10, 1937, Serial No. 130,143

7 Claims. (Cl. 128—288)

This invention relates to rubber pants and to similar articles.

In certain instances it is desirable to have the waist portion of rubber pants adjustable in order to fit the wearer snugly. However, it has not been possible to make prior seamless rubber pants adjustable owing to the fact that any break or interruption in the margins of the rubber layer thereof weakened this layer so much that it would tear when subjected even to small strains.

The main features of the present invention relates to seamless rubber pants having an interrupted or adjustable waist portion and having substantial portions of the free edges of the pants reinforced by marginal ridges integral therewith.

Another feature of the invention relates to a novel arrangement of seamless rubber pants wherein the waist portion thereof is readily adjustable and easily retained in its adjusted condition.

Various other features and advantages of the invention will appear from the detailed description and claims when taken with the drawings in which Fig. 1 is a front view of a pair of rubber pants in accordance with the present invention; Fig. 2 is a fragmentary section of the waist portion of the pants taken on the line 2—2 of Fig. 1; Fig. 3 is a section through one of the fastening strips taken on the line 3—3 of Fig. 1 illustrating the manner of reinforcing the exposed edges of the strip; Figs. 4 and 5 are fragments of the waist portion of the pants of Fig. 1 respectively showing a stage in the positioning of the adjustable strips and illustrating the strips in their fastened position; Fig. 6 is a section through the waist portion of the pants and the fastening strips the section being taken on the line 6—6 of Fig. 5; Figs. 7 and 8 are respectively a front view and an edge view of a modified type of pants; Fig. 9 is a fragmentary front view of this last mentioned type of pants showing how the adjusting strips are manipulated to complete the waist band of the pants; Figs. 10 and 11 are respectively a fragmentary front view and a fragmentary edge view of a modified type of pants and Fig. 12 is a fragmentary front view of the waist portion of these pants showing the position of the adjusting strip while the pants are being worn; Figs. 13, 14 and 15 are respectively a front view, a top view and an edge view of a further modified type of pants, and Fig. 16 is an edge view of these pants with their fastening strips tied.

Referring especially to Figs. 1 to 6 inclusive, the numeral 5 generally designates a pair of seamless rubber pants having a front portion 6 and a rear portion 7, these portions being integrally connected at the edges 8 of the pants approximately to a point where these edges engage the hips of the wearer. Leg openings 10 and 11 are provided in the lower portion of the pants. It will be noted that the portion 9 of each side edge of the pants above the mentioned point is interrupted to provide an interrupted waist portion so that the pants can be easily applied to the wearer, and at the same time providing a ventilation opening. Since the waist portion of the pants is thus interrupted, it is necessary to partially close the side openings 9 while the pants are being worn so that the waist portion thereof will snugly engage the waist of the wearer. In order to effect this result and in order to make the waist opening readily adjustable, the rear wall 7 of the pants adjacent each side interruption has a slit 12 therein while the upper margin of the front wall 6 of the pants at each side opening thereof has an integral adjusting strip 13. These strips 13 are provided with openings 14 while the front wall 6 of the pants is provided with other openings 15 adjacent the medial axis thereof. It should be understood that substantial portions of the margins of the pants are reinforced by ridges of rubber integral therewith, as will be noted from Figs. 2 and 3. By way of example only, in cross section the reinforcing ridges (not specifically illustrated) at the margins of the pants at the leg openings are generally wedge-shaped, that is similar to the reinforcing ridge defining the opening 12 in the pants.

In applying these pants to the wearer, the wearer's legs are inserted through the leg openings 10 and 11 while the pants are in the condition shown in Fig. 1. After the legs have thus been inserted and the upper portion of the pants drawn up to the wearer's waist, each adjusting strip 13 is inserted through its related opening 12. Thereafter, the strip is double backed to engage the front wall of the pants as shown at the left of Fig. 4. When these strips have thus been manipulated to bring certain of the openings 14 therein into registry with openings 15 in the front waist margin of the pants, a safety pin 16 is inserted therethrough and fastened as illustrated in Figs. 5 and 6. By this construction it will be appreciated that the pants are readily applied to the wearer and yet the waist portion thereof is adjustable to the size of the wearer's waist in order to afford a snug fit.

The modified pants shown in Figs. 7, 8 and 9 are similar to those already described and the corresponding parts thereof are identified by the same reference characters. In these pants it will be noted that instead of having the openings 15 at the center axis of the pants, a pair of equivalent openings 20 are provided in the front wall of the pants adjacent the side openings 9 thereof. As in the case of the pants already described, substantial portions of the edges of the pants are reinforced by ridges of rubber integral therewith.

The pants just described may be applied to the wearer in the same manner as the pants previously described. The adjusting strip 13 attached to the front waist margin of the pants is inserted through the opening 12 in the rear waist margin of the pants. Thereafter, the strip 13 is folded back upon the front wall of the pants until a pair of holes 14 in the strip register with a pair of openings 20 in the front wall. Thereafter, a safety pin is inserted through these openings and closed to retain the waist portion of the pants in this adjusted position. The strip on the other side of the pants is similarly manipulated. It will be understood that instead of using a safety pin at each adjusting strip, a suitable button similar to a collar button may be inserted through registering openings, or if desired, snap fasteners may be attached and used.

A further type of pants shown in Figs. 10, 11 and 12 is similar to that last described and corresponding parts thereof are likewise identified by the same reference characters. In this further modified type of pants the openings 12 in the rear waist margin are omitted and the adjusting strips 13' are integral with the rear waist margin instead of being integral with the front waist margin as in the foregoing forms of the invention.

These pants are applied to the wearer in the same manner as already described. However, they are fastened by folding each extension on to the front waist margin until one or more openings 14' in the extensions are in registry with one or more openings 20 in the front waist margin of the pants. Thereafter, fastening means such as a button, a safety pin or a snap fastener, fasten the extensions to the front wall of the pants to hold these parts in their adjusted position.

In Figs. 13 to 16 inclusive, there is illustrated a further modified type of pants in which the fastening strips such as 13 and 13' of the pants previously described are replaced by integral tying strips 25 respectively attached to the waist portions of the front and rear walls 6 and 7 of the pants.

The last-mentioned pants are applied to the wearer in the manner already described and when thus applied, are fastened about the wearer's waist by tying adjacent strips 25.

It should be understood that all free edges of the various type of pants herein disclosed are preferably reinforced by ridges of rubber integral therewith. While the present invention is not to be limited by the method of producing the pants they are preferably made by depositing latex or an aqueous dispersion of rubber on forms.

While certain types of reinforcing edges have been illustrated by way of example, the invention is not limited thereto, but if desired, the edge of the garment adjacent the reinforcements may be developed by cutting or dieing out the excess material.

What I claim is:

1. A pair of seamless, deposited rubber pants having leg openings and a waist opening therein, the margin of said pants at said waist opening being interrupted by a reentrant opening extending into the body of the pants, substantial portions of the edges of said pants at said waist opening being strengthened by reinforcements of rubber integral therewith, a strip integral with said waist margin at one side of said interruption, means on the other side of said interruption adapted to cooperate with said strip for detachably fastening together the interrupted portions of said margin.

2. A pair of seamless, deposited rubber pants having leg openings and a waist opening therein, the margin of said pants at said waist opening being interrupted adjacent the hip portions of said pants by reentrant openings extending into the body of the pants, the edges of said pants at said waist opening being strengthened by a reinforcement of rubber integral therewith, strips integral with said margin at each side of each interruption, whereby adjacent strips may be tied for detachably fastening together the interrupted portions of said margin.

3. A pair of seamless, deposited rubber pants having leg openings and a waist opening therein, the margin of said pants at said waist opening being interrupted adjacent the hip portions of said pants by reentrant openings extending into the body of the pants, substantial portions of the edges of said pants at said waist opening and at said leg openings being strengthened by a reinforcement of rubber integral therewith, a strip integral with said waist margin at one side of each interruption, means on the other side of each interruption adapted to cooperate with said strips for detachably fastening together the interrupted portions of said margins.

4. A pair of seamless deposited rubber pants having leg openings and a waist opening therein, the waist margin of said pants having an interruption therein defined by a reentrant opening extending into the body of the pants, and fastening strips integral with said waist portion at each side of said interruption whereby adjacent strips may be tied together to close the related interruption, the edges of said pants at said waist opening and certain of the edges of said strips being strengthened by a reinforcement of rubber integral therewith.

5. A pair of seamless deposited rubber pants having leg openings and a waist opening therein, the margin of said pants at said waist opening having an interruption therein defined by a reentrant opening extending into the body of the pants, a fastening strip integral with the waist margin of said pants adjacent said interruption at one side thereof and an aperture in said margin adjacent the other side of said interruption through which aperture said strip may be threaded, and means to fasten a portion of said strip to the waist margin of said pants.

6. A pair of seamless deposited rubber pants having leg openings and a waist opening therein, the margin of said pants at said waist opening being interrupted adjacent the hip portions of said pants by reentrant openings extending into the body of the pants, substantial portions of the edges of said pants at said waist opening and at said leg openings being strengthened by a reinforcement of rubber integral therewith, the waist margin of said pants adjacent one side of each of said interruptions having an aperture therein, a fastening strip integral with the waist margin of said pants adjacent the other side of each of said interruptions whereby a fastening strip may be inserted through the related aperture to close the interruption in said margin and means to fasten said strips in overlapping relation.

7. A pair of seamless deposited rubber pants having leg openings and a waist opening therein, the margin of said pants at said waist opening being interrupted adjacent the hip portions of said pants by reentrant openings extending into the body of the pants, said margin having at least one aperture therein intermediate of said interruptions, substantial portions of the edges of said pants at said waist opening and at said leg openings being strengthened by a reinforcement of rubber integral therewith, the waist margin of said pants adjacent one side of each of said interruptions having an aperture therein, a fastening strip integral with the waist margin of said pants adjacent the other side of each interruption whereby a fastening strip may be inserted through the related aperture to close the interruption in said margin, and means to fasten said strips in overlapping relation, said means extending through said first-mentioned aperture.

ABRAHAM N. SPÁNEL.